April 8, 1924. 1,489,261
U. MALIZIA
MACHINE FOR AUTOMATICALLY CONNECTING CINEMATOGRAPH FILMS OF ALL KINDS
Filed Dec. 30, 1922 2 Sheets-Sheet 1

Inventor

April 8, 1924.
U. MALIZIA
1,489,261
MACHINE FOR AUTOMATICALLY CONNECTING CINEMATOGRAPH FILMS OF ALL KINDS
Filed Dec. 30, 1922    2 Sheets-Sheet 2
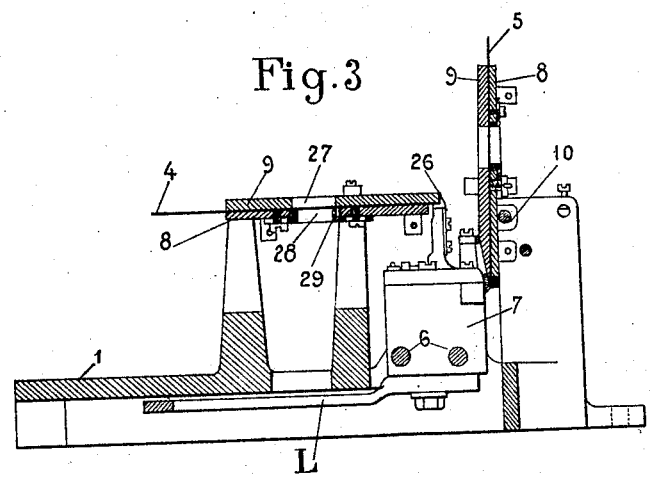
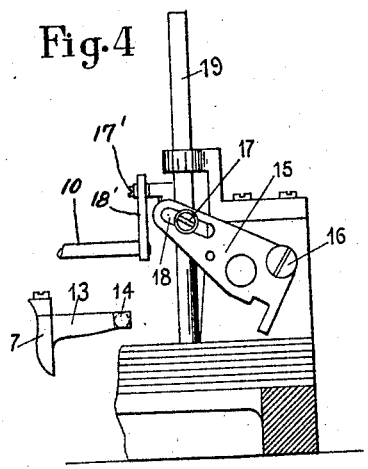
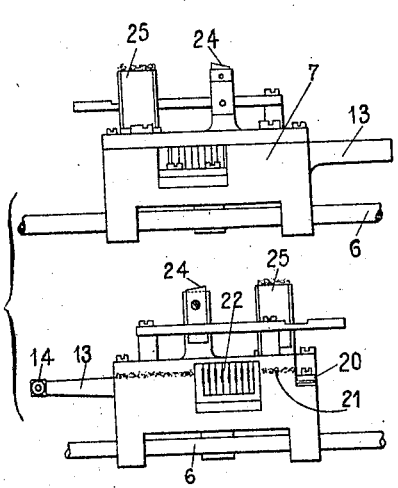
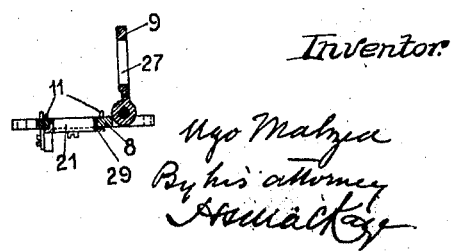

Patented Apr. 8, 1924.

1,489,261

UNITED STATES PATENT OFFICE.

UGO MALIZIA, OF PARIS, FRANCE.

MACHINE FOR AUTOMATICALLY CONNECTING CINEMATOGRAPH FILMS OF ALL KINDS.

Application filed December 30, 1922. Serial No. 610,064.

*To all whom it may concern:*

Be it known that I, UGO MALIZIA, residing at 19 Rue Vauquelin, Paris, France, an Italian citizen, have invented certain new and useful Improvements in or Relating to Machines for Automatically Connecting Cinematograph Films of All Kinds, of which the following is a specification.

The present invention relates to a machine for automatically connecting up cinematograph films which are subjected to numerous cuts in the process of making up a film. The machine offers the particular advantage of being simple in working and operable by hand with the aid of a lever which ensures rectilinear movement of a slide, which carries the whole of the accessories for cutting, scraping, moistening and gumming the ends of the films to be joined together.

The rapidity with which, by means of this invention, the films are connected is an important feature in a machine of this kind, when it is considered to what numerous transformations a film is subjected and the amount of manual work which must actually be undertaken in connection with an increasing production.

A feature of particular importance of the machine which is the subject of this invention resides in the mode of holding the film portions to be connected and consists in the provision of a system of horizontal plates forming the support for the films. One of these plates is arranged to be automatically rotated into a vertical position in order not to hinder the passage of the slide in the forward direction and to present a part of the film for the operations of cutting and moistening. During the return movement of the slide, on the one hand the scraping of the gelatine and the gumming of the movable portion of film is effected, while on the other hand the cutting and gumming of the stationary portion of film is also brought about.

In the extreme return position of the sliding carriage, the movable plate re-assumes the horizontal position and pressure is exerted in order to secure good contact for effecting the final connection of the parts.

In the annexed drawings which illustrate by way of example a machine according to this invention.

Fig. 3 is a longitudinal section along the axis of the film supports,

Fig. 4 shows in detail the mechanism for bringing about the angular movement of one support, Fig. 5 illustrates respectively the front and rear elevations of the carriage, and Fig. 6 is a transverse section through one of the plates.

Figure 1:
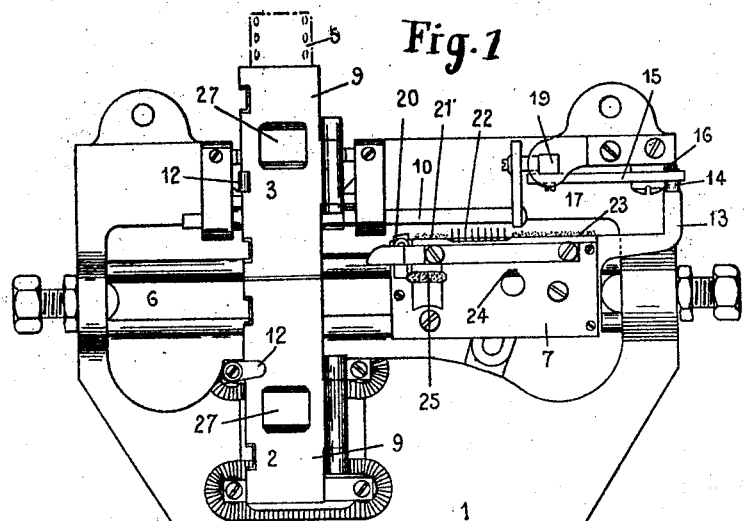
Fig. 1 is a plan view of the machine in its inoperative condition.

The machine consists essentially of a frame 1 with extension members carrying the plates 2 and 3 which are adapted to receive the films 4 and 5, the guide rods 6 on which slides the carriage 7 and the cam 15 whereby the carriage automatically operates the reversible plate 3.

The plates 2 and 3 are composed of a lower or base plate 8 and a top plate 9. The plate 2 is secured to the frame by means of four screws and the plate 3 is hinged on the shaft 10 of the controlling mechanism in order to enable it to be rotated into a vertical position when the lever L controlling the carriage has been operated to a certain position.

The portions of the film to be connected are placed on the plates between the upper and lower members and are held in position by means of pins 11 (Fig. 6) which enter the perforations in the film. These pins are afterwards tightened when the top member is secured to the locking device 12.

In placing the films on the plates 2 and 3, it should be noted that the rotatable plate 3 must be dealt with first, the sensitized side being on top so that the film 5 is in position to be cut, coated with gum and then connected. The fitting up of the plate 2 is not carried out until after the carriage has been actuated as will hereinafter be more clearly seen.

The various operations effected on this film are first done superficially in a definite order on the first movement of the carriage and afterwards simultaneously for the two films on the return or second movement of the carriage.

Figure 2:
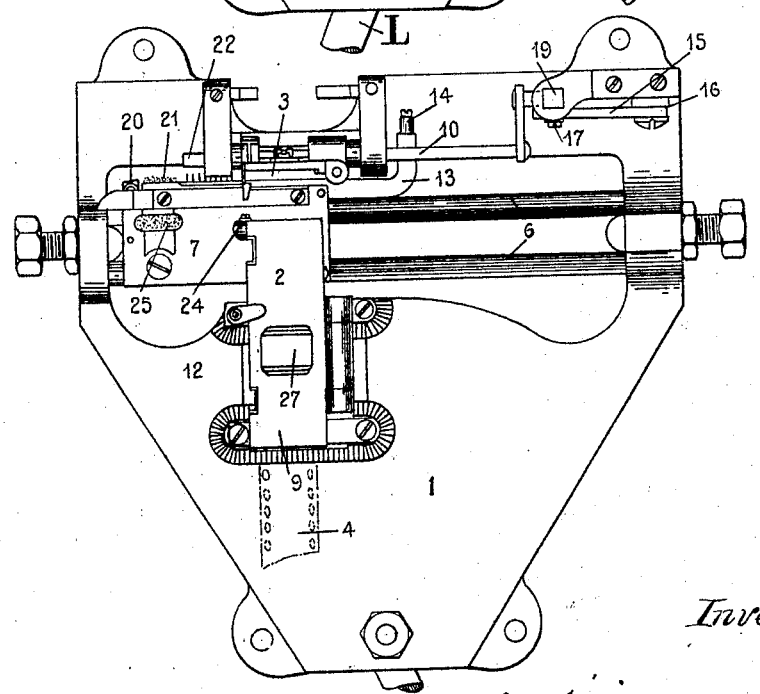
Fig. 2 is a similar plan view showing the carriage in the course of operation.

The carriage, which is actuated by the lever L, upon being displaced on the guides 6, by means of a finger 13 carrying the roller 14, operates a cam 15, which is pivoted at 16. Thereupon the cam, by means of a stub axle 17 which passes through the eye piece 18 raises a vertical rod 19 which is guided in the framework. Movement of the rod 19 is transmitted to the shaft 10, upon which is mounted the tilting plate 3, by means of a pin 17' on the rod, which engages the slotted lever 18' fixed to the shaft 10. (See particularly Figure 4). Since the angular movement is limited to 90°, the plate 3 is brought into a vertical position when the carriage has been moved to the position shown in Fig. 2 by means of its actuating lever.

In its passage in front of the film which is now held in vertical position, the carriage has effected the cutting of the end of this film by a knife 20 at the forward end of the carriage, has moistened and superficially scraped the emulsion off the film by the passage successively thereover of a gumming pad 21 and scrapers 22, and finally at the end of its forward travel it has brought the moistening pad 23 into contact with the extremity of the film.

In this position of the carriage and of the movable plate the second portion of the film is attached to the plate 2.

The time necessary for the connection to the fixed plate 2 will permit the moistening pad 23 to moisten the film 5. As soon as the plate 2 is fitted up with the film, the lever is actuated to bring the carriage back to its initial position and to effect thereby the gumming together of the films. The carriage on its return movement, in again passing in front of the film which is held in vertical position effects the final scraping of the gelatine and thereafter coats the scraped portion with gum. However while these operations are taking place on the film 5, a cutter 24 cuts the end of the film portion 4 on the horizontal plate 2 and a pad 25 coats the film with gum at the same moment as the film portion 5 receives the contact of the gumming pad 21. This simultaneous gumming of the films is important in that the extremities of the films to be connected should both be ready to receive the pressure for their agglutination. This pressure can be produced in any desired way by the sudden return of the plate 3 to its horizontal position thus striking the top member 26 of the plate 2 in the return of the parts to their initial position.

As will be readily seen the function of the machine on the whole is simple and its most important feature resides in the provision of the movable plate which enables the slide carrying the connecting mechanism to operate simultaneously on the films which at a certain moment are brought into line with each other in a position to be joined.

It does not appear necessary to describe in detail certain parts of the machine which are purely constructional points, for instance the connection of the lever to the carriage, the limiting of the movement of the carriage on its guides by end stops, the internal arrangement of the carriage into compartments containing glutinous agents and water for use in the operations above described. It should be mentioned, however, that the top and bottom members of the plates are provided with windows or openings 27 and 28 which permit inspection of the pictures on the film against a suitable source of light. These inspection openings are moreover combined with an adjustable window 29 to enable the machine to be adapted to any kind of division of the film.

What I claim and desire to protect by Letters Patent is—

1. A machine for the automatic connection of two cinametograph and like films comprising a fixed horizontal plate for holding one of said films, a second plate for holding said other film, said second plate being rotatable about a horizontal axis from a horizontal to a vertical position, a sliding carriage arranged to cause said rotation of said second plate, a lever for moving said carriage, means on said carriage for preparing said films for connection when said carriage slides past them and means for returning said second plate to a horizontal position when said carriage returns to its initial position.

2. In a machine for the automatic connection of two cinematograph or like films, a sliding carriage, guide bars for ensuring rectilinear motion of said carriage, a projection on said carriage, a cam adapted to be engaged by said projection, a system of levers operated by said cam and a movable plate for holding one of said films and adapted to be rotated about a horizontal axis when said levers are operated.

3. In a machine for the automatic connection of two cinematograph or like films, a sliding carriage, having a vertical and a horizontal face, a horizontal cutter, a gumming pad, flexible scrapers and a moistening pad in order on said vertical face and a vertical cutter and a gumming pad on said horizontal face.

In testimony whereof I affix my signature.

UGO MALIZIA.